(12) United States Patent
Mueller

(10) Patent No.: US 9,434,559 B2
(45) Date of Patent: Sep. 6, 2016

(54) LIGHTWEIGHT MULTI-LAYER FOAM DOCK SEAL SYSTEM

(71) Applicant: Blue Giant Equipment Corporation, Brampton (CA)

(72) Inventor: David H. Mueller, Everett (CA)

(73) Assignee: Blue Giant Equipment Corporation, Brampton, Ontario (CA)

( * ) Notice: Subject to any disclaimer, the term of this patent is extended or adjusted under 35 U.S.C. 154(b) by 0 days.

(21) Appl. No.: 14/508,515

(22) Filed: Oct. 7, 2014

(65) Prior Publication Data

US 2016/0083203 A1   Mar. 24, 2016

Related U.S. Application Data

(60) Provisional application No. 62/052,655, filed on Sep. 19, 2014.

(51) Int. Cl.
| | |
|---|---|
| B63B 59/02 | (2006.01) |
| B65G 69/00 | (2006.01) |
| E04F 19/02 | (2006.01) |

(52) U.S. Cl.
CPC ........... *B65G 69/008* (2013.01); *E04F 19/026* (2013.01)

(58) Field of Classification Search
CPC  B65G 69/008; Y10T 428/239; A47C 7/021; B63B 59/02; E06B 7/23; E02B 3/26
See application file for complete search history.

(56) References Cited

U.S. PATENT DOCUMENTS

| | | | | |
|---|---|---|---|---|
| 2,704,574 | A * | 3/1955 | Etlar | B65G 69/008 135/115 |
| 3,179,397 | A * | 4/1965 | Cleereman | E02B 3/26 114/219 |
| 3,500,599 | A * | 3/1970 | Samuel | B65G 69/008 52/173.2 |
| 4,776,048 | A * | 10/1988 | Wilheim | B60N 2/4879 5/636 |
| 4,799,342 | A * | 1/1989 | Klevnjans | E04F 10/04 52/173.2 |
| 5,394,662 | A | 3/1995 | Giuliani et al. | |
| 5,953,868 | A | 9/1999 | Giuliani et al. | |
| 7,383,664 | B2 | 6/2008 | Chalfant | |
| 7,527,454 | B1 * | 5/2009 | Brushaber | E02B 3/26 114/219 |
| 7,703,245 | B2 | 4/2010 | Chalfant | |
| 7,757,442 | B2 | 7/2010 | Hoffmann et al. | |
| 8,074,311 | B2 * | 12/2011 | Haynesworth | A47C 7/021 5/640 |
| 8,112,949 | B2 | 2/2012 | Eungard | |
| 8,141,305 | B2 | 3/2012 | Digmann et al. | |
| 8,181,401 | B2 | 5/2012 | Eungard | |

(Continued)

*Primary Examiner* — Rodney Mintz
*Assistant Examiner* — Daniel Kenny
(74) *Attorney, Agent, or Firm* — Price Heneveld LLP

(57) ABSTRACT

A loading dock seal system includes a closed-cell foam buffer adapted to be positioned proximate a loading dock surface and a foam padding disposed adjacent the closed-cell foam buffer and affixed thereto. A fabric cover, being free of overlapping members proximate the loading dock surface, defines an interior volume. The closed-cell foam buffer and the foam padding are disposed within the interior volume. A fabric fastener being free of overlapping portions defines an aperture through the fabric cover that is sized to receive and to release the affixed closed-cell foam buffer and the foam padding from the interior volume. Fabric tabs are connected to the fabric cover and extend away from and are substantially parallel to the rear side of the fabric cover. The attachment of the fabric tabs to the loading dock surface is adapted to be free of mounting brackets.

7 Claims, 15 Drawing Sheets

(56) References Cited

U.S. PATENT DOCUMENTS

| | | | |
|---|---|---|---|
| 8,307,588 B2* | 11/2012 | Hoffmann | B65G 69/008 52/173.2 |
| 8,307,589 B2 | 11/2012 | Eungard | |
| 8,495,838 B2* | 7/2013 | Digmann | B65G 69/008 277/650 |
| 2013/0031853 A1 | 2/2013 | Hoffmann et al. | |

* cited by examiner

LIGHTWEIGHT MULTI-LAYER FOAM DOCK SEAL SYSTEM

CROSS-REFERENCE TO RELATED APPLICATION

This application claims priority to and the benefit under 35 U.S.C. §119(e) of U.S. Provisional Patent Application No. 62/052,655, filed on Sep. 19, 2014, entitled "LIGHTWEIGHT MULTI-LAYER FOAM DOCK SEAL SYSTEM," the entire disclosure of which is hereby incorporated herein by reference.

FIELD OF THE INVENTION

The invention is in the field of loading dock bumpers and seals and methods for creating and installing lightweight loading dock seals having a layered foam core.

SUMMARY OF THE INVENTION

A loading dock seal system includes a closed-cell foam buffer adapted to be positioned proximate a loading dock structural wall surface and a foam padding disposed adjacent the closed-cell foam buffer and affixed thereto. The foam padding is disposed adjacent the closed-cell foam buffer on a side distal from the loading dock structural wall surface. A fabric cover includes a front side and a rear side and defines an interior volume. The closed-cell foam buffer and the foam padding are disposed within the interior volume. The fabric cover is free of overlapping members at least proximate the loading dock structural wall surface. At least one fabric fastener defines an aperture through the fabric cover, the fastener is typically free of overlapping portions, and the aperture is sized to receive and to release the affixed closed-cell foam buffer and the foam padding from the interior volume. A plurality of loading dock structure engaging fabric tabs is connected to the fabric cover proximate the rear side. The plurality of fabric tabs extend away from and substantially parallel to the rear side, and the attachment of the plurality of fabric tabs to the loading dock structural wall surface is adapted to be free of mounting brackets.

A loading dock seal system includes a fabric cover free of outwardly-protruding overlapping portions, having front, rear, left and right sides and defining an interior volume having a rectangular prism shape. The loading dock seal system further includes a fabric connector configured to repeatedly open and close aperture within the fabric cover, the fabric connector being free of overlapping portions, and extending from a location proximate a bottom end of the rear side of the fabric cover and extending to a location proximate a top end of the rear side of the fabric cover. When in a mounted position, wherein the mounted position of the fabric cover is defined by the rear side of the fabric cover at least partially engaging a loading dock structural surface. A plurality of spaced fabric tabs extends away from the fabric cover. The fabric tabs are typically adapted to connect the fabric cover to the loading dock structural wall surface using a fastener, but without the use of mounting brackets. Each of the plurality of spaced fabric tabs includes at least one grommet that engages a corresponding fastener of the loading dock structural wall surface. The fabric tabs are flexible and capable of being bent by hand without the use of tools. A foam composite bolster is adapted for insertion into and removal from the interior volume of the fabric cover. The foam composite bolster may be a closed-cell foam buffer disposed adjacent a rear portion of the interior volume and proximate the rear side of the fabric cover. The closed-cell foam buffer includes a material having a density of at least about 2.1 pounds per cubic foot to about 4.3 pounds per cubic foot. The closed-cell foam buffer is a substantially rigid member adapted to substantially conform to a shape of the loading dock structural wall surface around a dock entryway or dock doorway to form a substantially watertight seal between the fabric cover and the loading dock structural wall surface. A foam pad is disposed within a front portion of the interior volume and permanently affixed to the closed-cell foam buffer. The foam pad includes a material having an average density of from about 0.8 pounds per cubic foot to about 1.1 pounds per cubic foot. The closed-cell foam buffer and the foam pad are typically coextensive with one another and form a single integral piece.

A method for installing a loading dock seal system onto a loading dock structural wall surface includes the step of providing a fabric cover free of outwardly-protruding overlapping portions, having front, rear, left and right sides and defining an interior volume having a rectangular prism shape. The method further includes the step of providing a fabric connector defining an aperture within the fabric cover, the fabric connector being free of overlapping portions and extending from a location proximate a bottom end of the rear side of the fabric cover and extending to a location proximate a top end of the rear side of the fabric cover. A plurality of spaced fabric tabs are also provided that extend away from the fabric cover. Each of the plurality of spaced fabric tabs includes at least one grommet, and the fabric tabs are flexible and capable of being bent by hand without the use of tools. A foam composite bolster is provided and adapted for insertion into and removal from the interior volume of the fabric cover. The foam composite bolster further includes a closed-cell foam buffer portion of a material having a density within the range of at least about 2.1 pounds per cubic foot to about 4.3 pounds per cubic foot. A foam pad portion is permanently affixed to the closed-cell foam buffer and includes a material having an average density of approximately 0.92 pounds per cubic foot or less, more typically an average density of from about 1.1 pounds per cubic foot to about 0.8 pounds per cubic foot. The closed-cell foam buffer portion and the foam pad portion of the foam composite bolster are coextensive with one another and form a single integral piece. The method further includes the step of disposing or inserting the foam composite bolster through the aperture defined by the fabric connector such that the closed-cell foam buffer portion is disposed adjacent a rear portion of the interior volume and proximate the rear side of the fabric cover, and the foam pad portion is disposed within a front portion of the interior volume. The method further includes the step of encasing the foam composite bolster within the interior volume of the fabric cover by closing the aperture. The rear side of the fabric cover engages the loading dock structural wall surface such that each and typically all, of the plurality of spaced fabric tabs extend away from the rear side of the fabric cover and are positioned in at least partial engagement with the loading dock structural wall surface. The method further includes the step of disposing the plurality of spaced fabric tabs to extend away from the rear side of the fabric cover, and such that a back surface of each of the plurality of fabric tabs is positioned in at least partial engagement with the loading dock structural wall surface. The method further includes the step of fastening the plurality of spaced fabric tabs to the loading dock structural wall surface by anchoring a wall fastener through each corresponding grommet. The wall fastener fixes a corresponding spaced fabric tab of the plurality of spaced fabric tabs against the loading dock structural wall surface. Fixing the plurality of spaced fabric tabs to the loading dock structural wall surface substantially presses the rear of the fabric cover against the loading dock structural wall surface to form a substantially water-tight seal between the fabric cover and the loading dock structural wall surface.

These and other features, advantages, and objects of the present invention will be further understood and appreciated by those skilled in the art by reference to the following specification, claims, and appended drawings.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. Drawings are not necessary to scale. Certain features of the invention may be exaggerated in scale or shown in schematic form in the interest of clarity and conciseness.

DETAILED DESCRIPTION OF THE EMBODIMENTS

Figure 1:
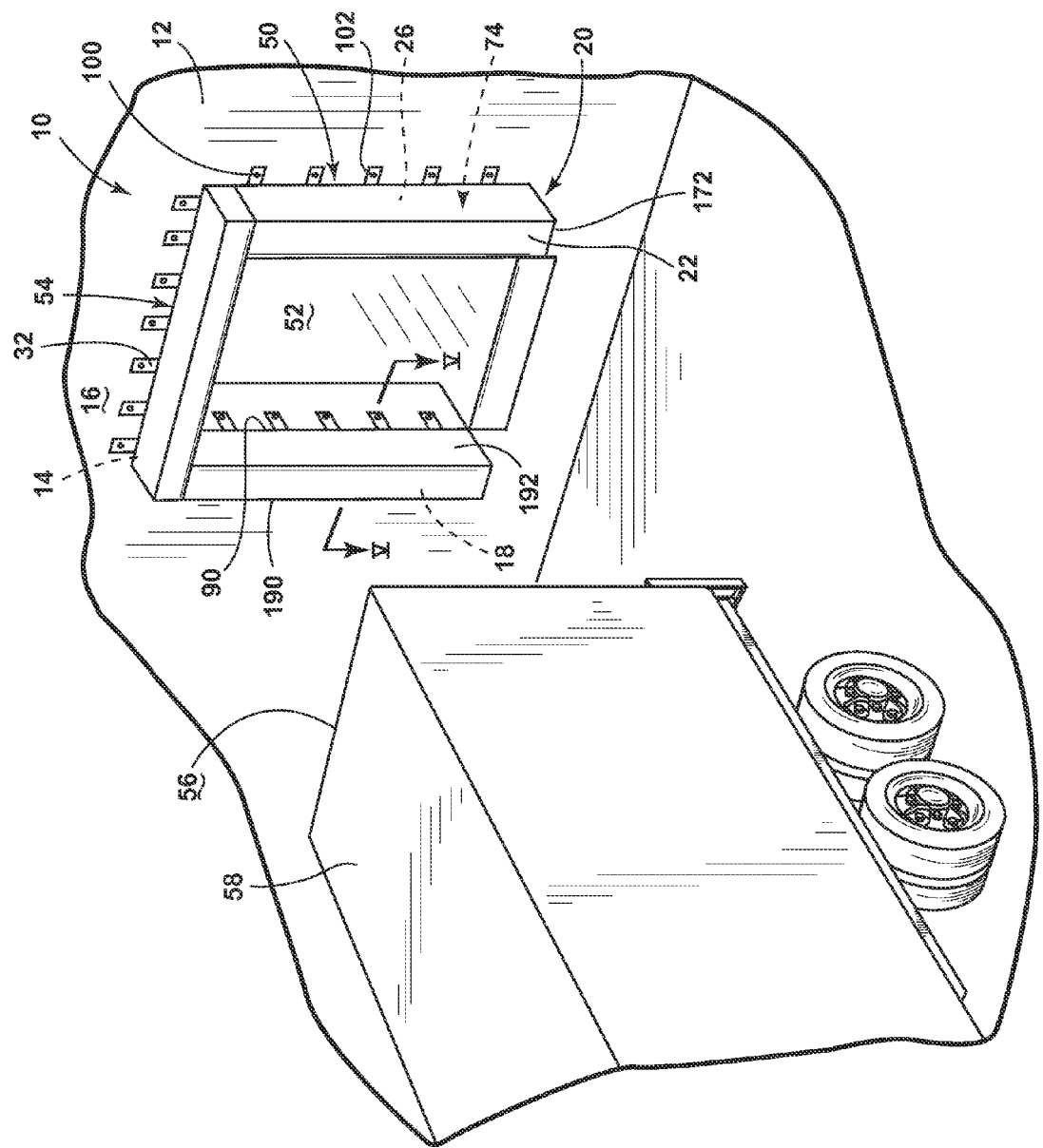
FIG. 1 is a front perspective view of a loading dock incorporating one embodiment of the multi-layer foam dock seal system.
Figure 2:
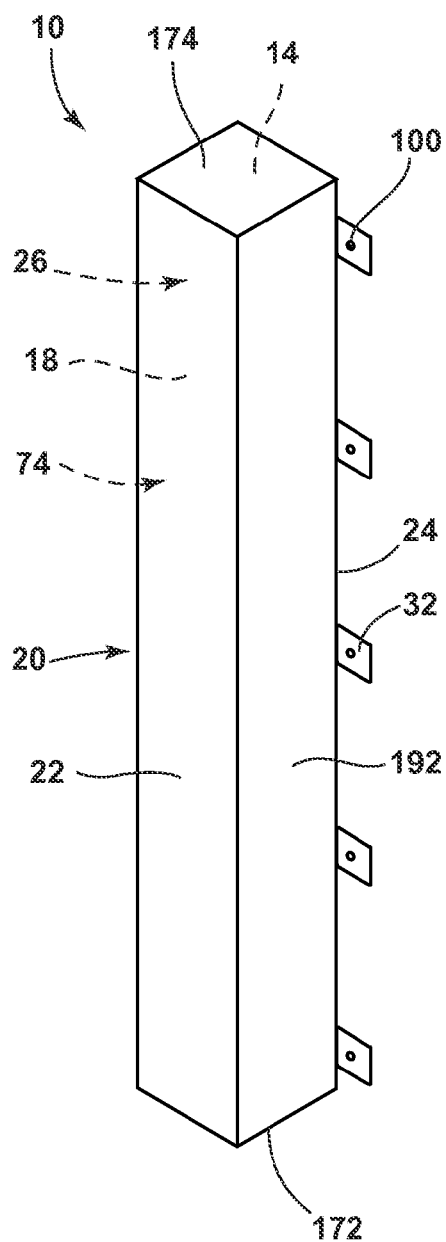
FIG. 2 is a front perspective view of another embodiment of the multi-layer dock seal system.
Figure 3:
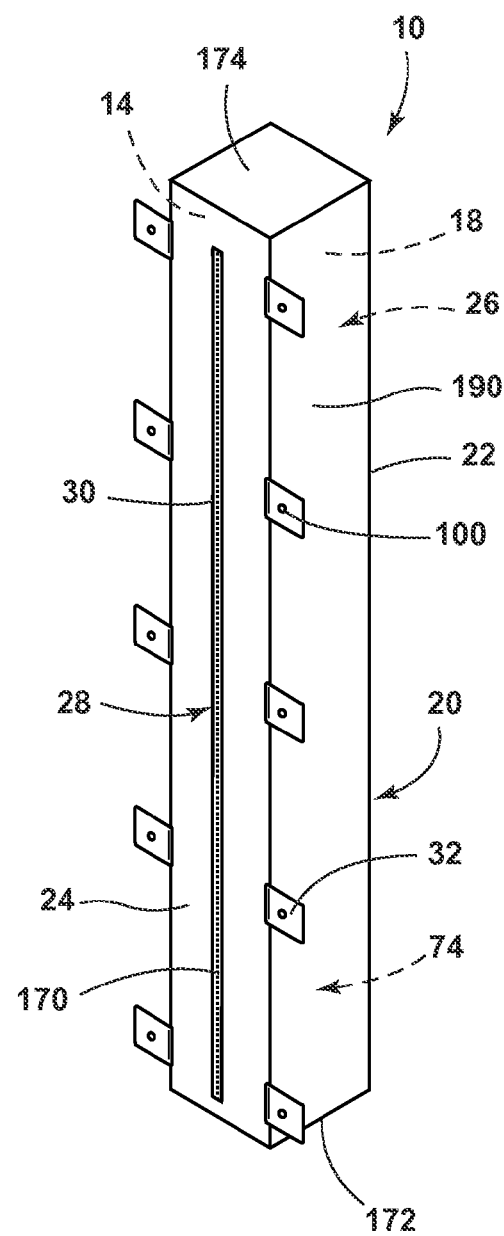
FIG. 3 is a rear perspective view of the multi-layer dock seal system of FIG. 2 with the fabric fastener in a closed position.
Figure 4:
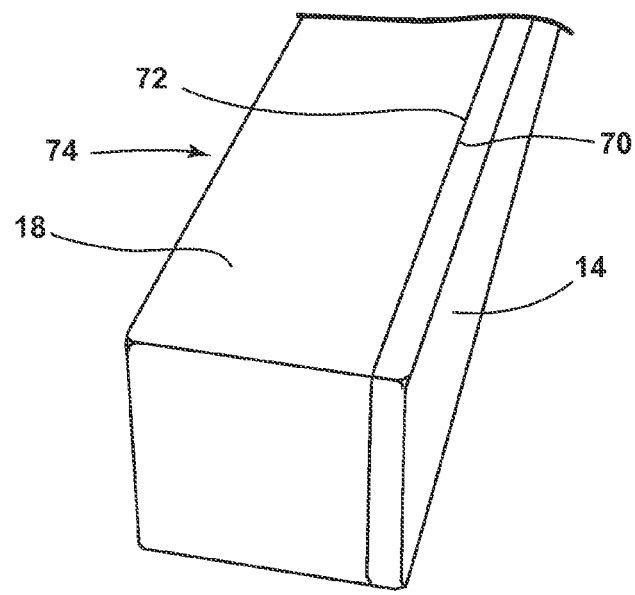
FIG. 4 is a top perspective view of the multi-layer foam composite bolster of another embodiment of the multi-layer foam dock seal system.
Figure 5:
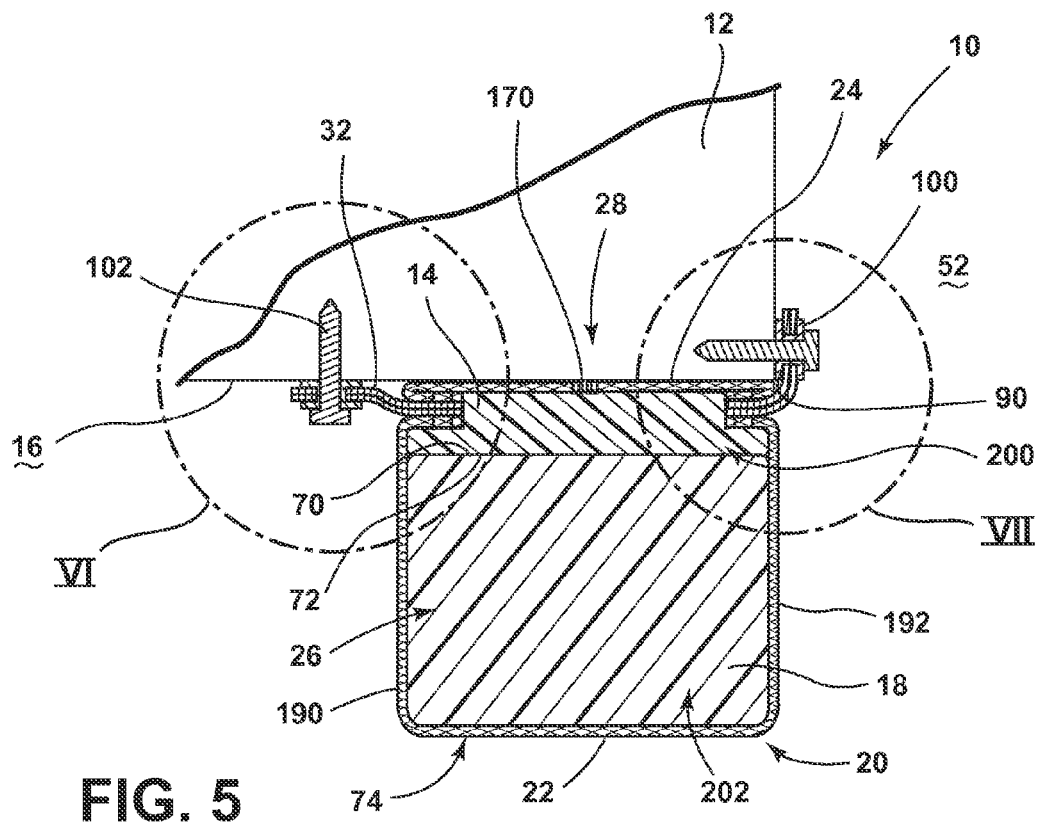
FIG. 5 is a cross-sectional view of the multi-layer dock seal system of FIG. 1 taken along line V-V.
Figure 6:
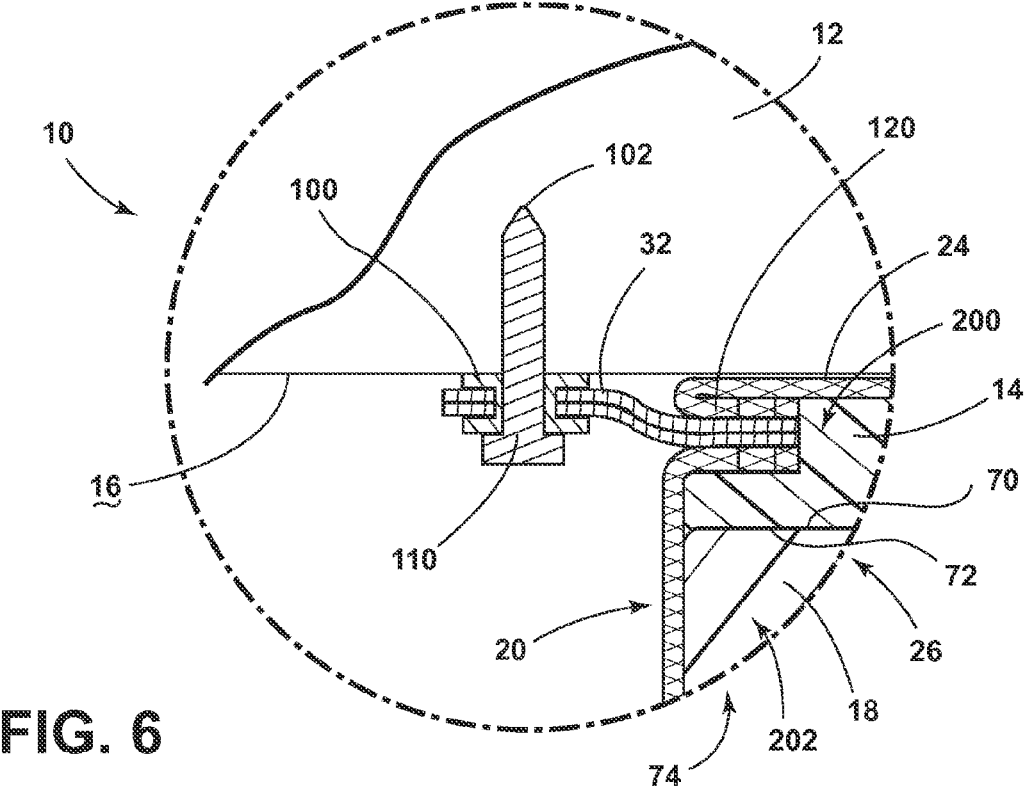
FIG. 6 is an enlarged cross-sectional view of a fabric tab of the multi-layer foam dock seal system of FIG. 5 taken at area VI, with the fabric tab installed in a flush-mount condition.
Figure 7:
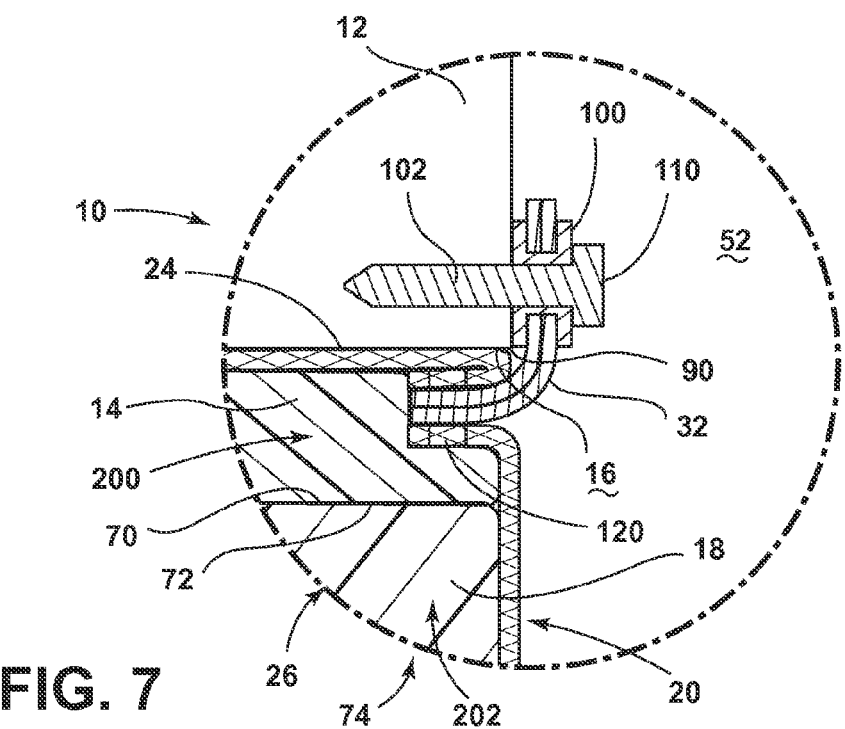
FIG. 7 is an enlarged cross-sectional view of the fabric tab of the multi-layer foam dock seal system of FIG. 5 taken at area VII, with the fabric tab installed at a corner wall condition.
Figure 8:
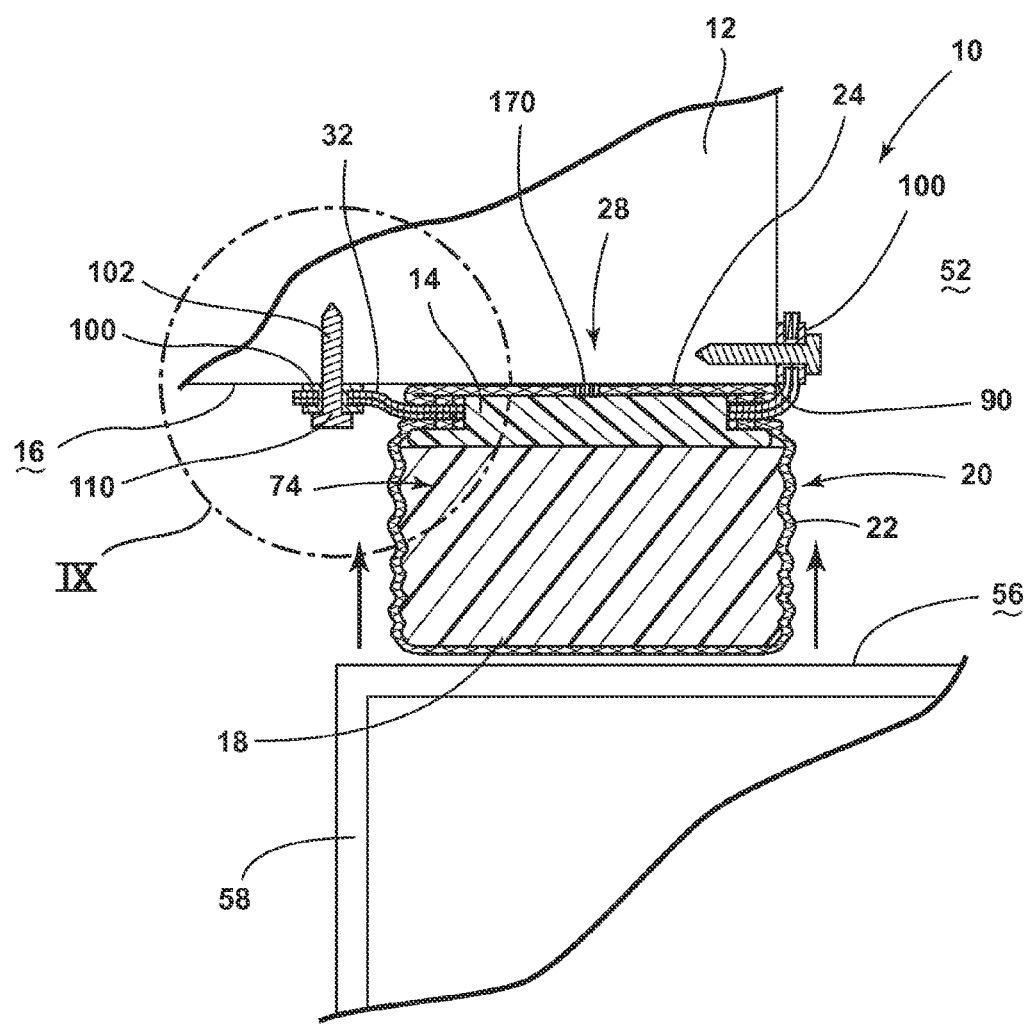
FIG. 8 is a cross-sectional view of the multi-layer dock seal system of FIG. 5, with a transportation vehicle engaging and compressing the multi-layer dock seal system.
Figure 9:
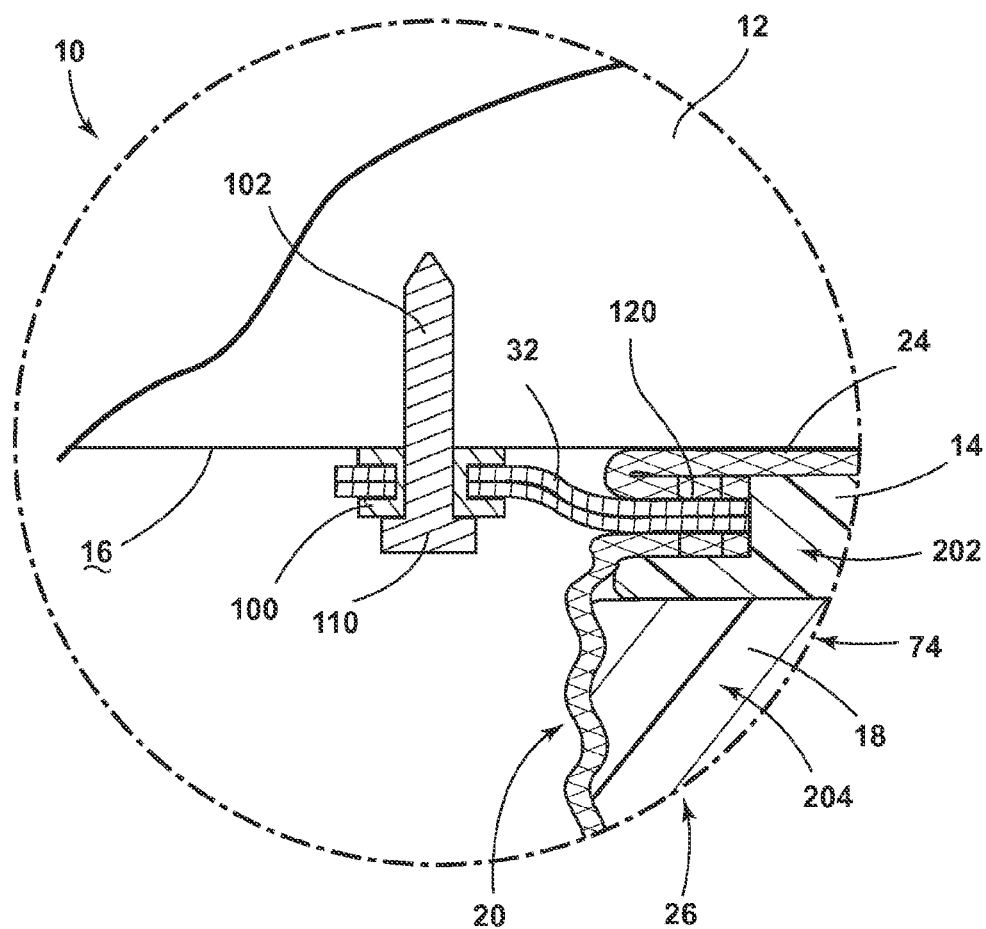
FIG. 9 is an enlarged cross-sectional view of the multi-layer dock seal system of FIG. 8.
Figure 10:
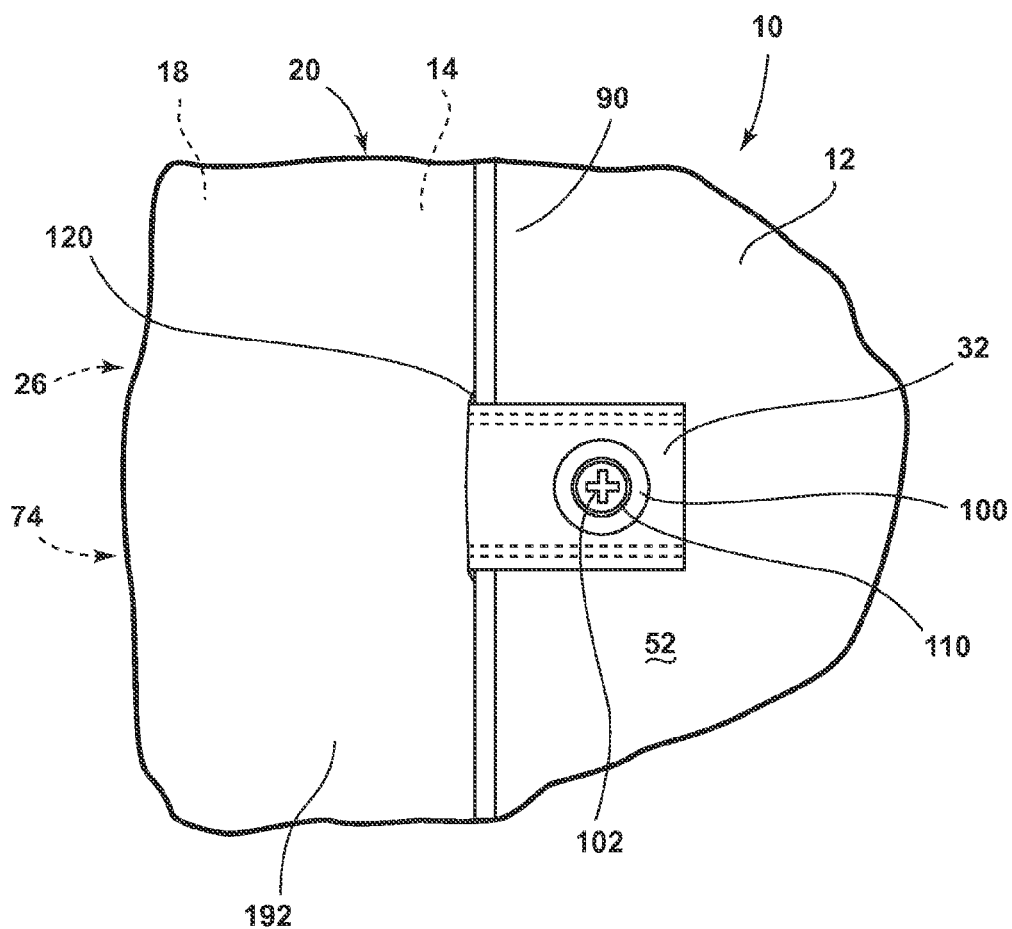
FIG. 10 is a side elevational view of the fabric tab of an alternate embodiment of the multi-layer foam dock seal system, with the fabric tab installed at an angled/bent condition.
Figure 11:
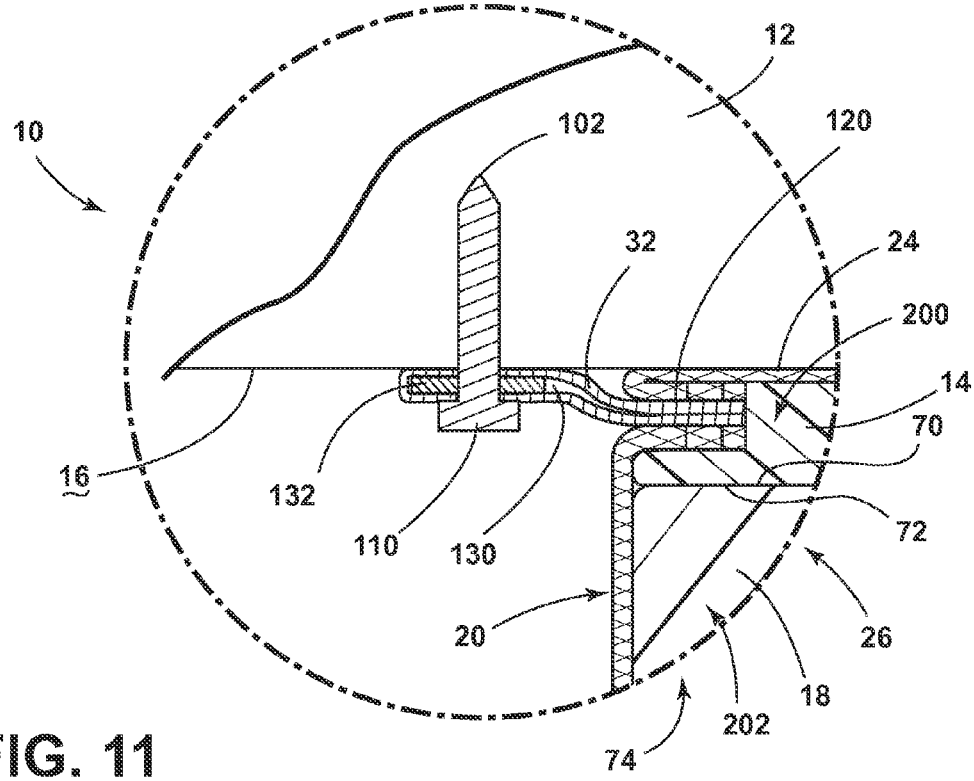
FIG. 11 is a cross-sectional view of a fabric tab of an alternate embodiment of the multi-layer foam dock seal system where the fabric tab includes a support substrate member and the fabric tab is installed in a flush-mount condition.
Figure 12:
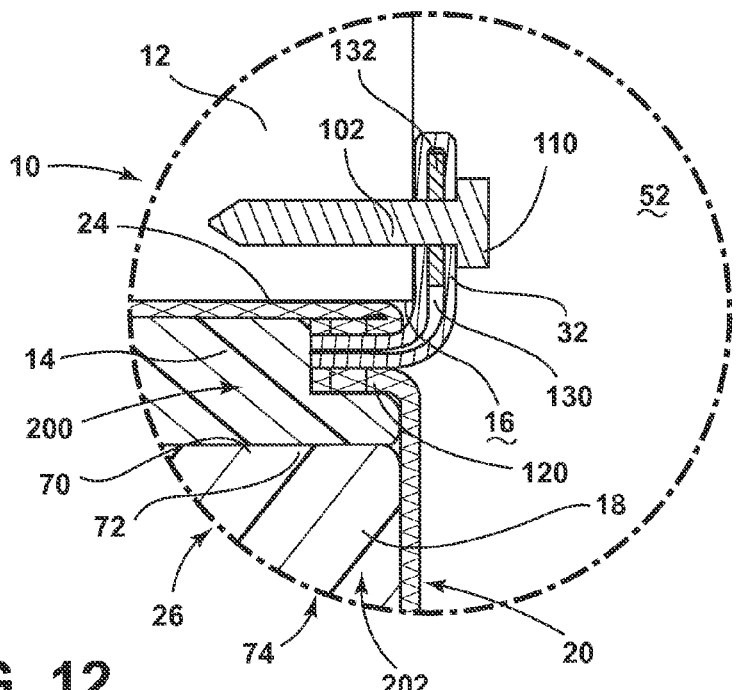
FIG. 12 is a cross-sectional view of a fabric tab of the multi-layer foam dock seal system of FIG. 11, with a support substrate member disposed within the fabric tab, and the fabric tab installed at a corner wall condition.

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

With respect to FIGS. 1-4, reference numeral 10 generally refers to a loading dock seal system that can be installed upon a loading dock structure 12. The loading dock seal system 10 includes a closed-cell foam buffer 14 that is adapted to be positioned proximate a loading dock structural wall surface 16. A foam padding 18 is disposed adjacent to the closed-cell foam buffer 14 and is affixed thereto. The foam padding 18 is disposed adjacent the closed-cell foam buffer 14 on a side distal from the loading dock structural wall surface 16. The loading dock seal system 10 also includes a fabric cover 20 having a front side 22 and a rear side 24 and an interior volume 26. The closed-cell foam buffer 14 and the foam padding 18 are disposed within the interior volume 26.

The fabric cover 20 is configured to be free of overlapping members in an area proximate the loading dock structural wall surface 16. The loading dock seal system 10 also includes at least one fabric fastener 28 that is configured to allow for opening, closing and reopening, etc. of an aperture 30 through the fabric cover 20. The fabric fastener 28 may be free of overlapping portions.

The aperture 30 is sized to receive and to release the affixed closed-cell foam buffer 14 and the foam padding 18 from the interior volume 26 when the closed-cell foam buffer 14 and foam padding 18 are affixed to one another. A plurality of fabric tabs 32 for engaging the loading dock structure 12 to a building wall surface, typically an exterior loading dock structural wall surface 16, are connected to the fabric cover 20 proximate the rear side 24 of the fabric cover 20. They are typically engaged or separately sewn into engagement with the cover along the sides of the cover or at the seam of the side and rear of the cover as shown in at least FIGS. 2 and 3. In various alternate embodiments, the fabric tabs 32 can be integral with the fabric cover 20, such that portions of the fabric cover 20 extend outward to form at least a portion of the plurality of fabric tabs 32. The plurality of fabric tabs 32 generally extend away from and are substantially parallel to the rear side 24 of the fabric cover 20 when engaged to a structure or in use. The attachment of the plurality of fabric tabs 32 to the loading dock structural wall surface 16 is adapted to be free of mounting brackets, i.e. separate mounting brackets are not necessary to mount the loading dock seal system 10.

Referring again to FIGS. 1-9, the loading dock seal system 10 can include two vertical sections 50 that are disposed on opposing sides of a loading dock opening 52, which may or may not have a door. The loading dock seal system 10 can also include a lintel section 54 that extends above the loading dock opening 52 between the vertical sections 50 of the loading dock seal system 10. Alternatively, the lintel section 54 can span over the vertical sections 50 and the loading dock opening 52. In this manner, the vertical sections 50 and lintel section 54 of loading dock seal system 10 form an enclosure around the loading dock opening 52 that is configured to receive the rear surface 56 of a tractor/trailer, box truck, or other similar transportation vehicle 58 or apparatus.

When the rear surface 56 of the transportation vehicle 58 engages the loading dock seal system 10, the loading dock seal system 10, which is adapted to compress, compresses such that a substantially watertight seal is created between the rear side 24 of the fabric cover 20 and the loading dock structural wall surface 16. Additionally, a substantially watertight seal is created between the rear surface 56 of the transportation vehicle 58 and the front side 22 of the fabric cover 20. Accordingly, the loading dock seal system 10 allows the engagement between the transportation vehicle 58 and the loading dock structural wall surface 16 to be substantially watertight and weatherproof such that loading and unloading of the transportation vehicle 58 can be accomplished without substantial interference from rain, snow, and other precipitating weather conditions. The manner in which the loading dock seal system 10 accomplishes this watertight engagement between the transportation vehicle 58 and the loading dock structural wall surface 16 will be described more fully below.

Referring now to the embodiments illustrated in FIGS. 5-9, the closed-cell foam buffer 14 of the loading dock seal system 10 is a substantially rigid member that is adapted to substantially conform to the loading dock structural wall surface 16. In this manner, the closed-cell foam buffer 14, while substantially rigid, is afforded some limited elastic deformation or deflection in order to substantially conform to the loading dock structural wall surface 16. Pressure exerted upon the closed-cell foam buffer 14 by the transportation vehicle 58 pressing the loading dock seal system 10 against the loading dock structural wall surface 16 accomplishes this limited deformation of the closed-cell foam buffer 14. Accordingly, due to deformation of the closed-cell foam buffer 14, a substantially watertight seal between the fabric cover 20 and the loading dock structural wall surface 16 can be created when the transportation vehicle 58 engages the loading dock seal system 10. In this manner, the rear side 24 of the fabric cover 20 is compressed between the closed-cell foam buffer 14 and the loading dock structural wall surface 16. In addition, the substantially rigid character of the closed-cell foam buffer 14 provides structure to the loading dock seal system 10 such that the vertical and lintel sections 50, 54 can be transported and otherwise manipulated without significant bending or other deformation. In this manner, the vertical and lintel sections 50, 54 of the loading dock seal system 10 are configured to substantially retain their shape during assembly and installation.

In the various embodiments, it is contemplated that the material of the closed-cell foam buffer 14 can include various materials that include, but are not limited to, engineered foam, foam board, polystyrene, polyisocyanurate, various other polymers, and other similar foam-type products. It is contemplated that the material of the closed-cell foam buffer 14 can include a compressive strength within the range of approximately 7 pounds per square inch ("psi") to approximately 20 psi. Alternatively, the material of the closed-cell foam buffer 14 can include a compressive strength within the range of approximately 13 psi to approximately 24 psi. It is contemplated that the material of the closed-cell foam buffer 14 can include a material having a density within the range of at least about 2.1 pounds per cubic foot ("lb/ft$^3$") to about 4.3 lb/ft$^3$.

Referring again to the embodiment illustrated in FIGS. 4-9, a front surface 70 of the closed-cell foam buffer 14 is engaged with a back surface 72 of the foam padding 18 to form an integral foam composite bolster 74. It is contemplated that the closed-cell foam buffer 14 and the foam padding 18 are coextensive with one another. It is further contemplated that the closed-cell foam buffer 14 and the foam padding 18 can be coextruded foam members that form the foam composite bolster 74. It is also contemplated that the foam padding 18 can be a substantially compressible material having elastic properties such that the foam padding 18 tends to retain its shape after being compressed between the transportation vehicle 58 and the loading dock structural wall surface 16.

It is also contemplated that the closed-cell foam buffer 14 and the foam padding 18 can be molded together such that the foam composite bolster 74 made up of the closed-cell foam buffer 14 and foam padding 18 can be made as a single integral member. In such an embodiment, it is contemplated that the foam composite bolster 74 can include a varying density where the foam composite bolster 74 has a lower density toward the front side 22 of the fabric cover 20 and a greater density toward the rear side 24 of the fabric cover 20. In this manner, the transition between the closed-cell foam buffer 14 and the foam padding 18 can be either a minimal planar transition, or can be a more gradual transition through the interior of the foam composite bolster 74 such that the material of the closed-cell foam buffer 14 and the material of the foam padding 18 may, in some embodiments, at least partially merge to form the transitional portion of the foam composite bolster 74. In other alternate embodiments, the foam composite bolster 74 can include other foam layers in addition to the closed-cell foam buffer 14 and the foam padding 18.

In the various embodiments, the material of the foam padding 18 can include various materials that include, but are not limited to, polyurethane foam, polyethylene foam, polyvinylchloride foam, urethane foam, various other polymers, combinations thereof, as well as others. It is further contemplated that the material of the foam padding 18 can include an average density within the range of approximately 0.8 lb/ft$^3$ to approximately 1.1 lb/ft$^3$, more typically about 0.92 lb/ft$^3$.

It is also contemplated, in various embodiments, that the closed-cell foam buffer 14 and the foam padding 18 can be separate members that are engaged together by heat welding, through mechanical attachments, through the use of adhesive materials, and other similar fastening or connecting methods.

In various alternate embodiments, it is contemplated that the closed-cell foam buffer 14 and the foam padding 18 can be separate members that are substantially free of any mechanical, adhesive, or other attachments between the two members. In such an embodiment, the disposal of the closed-cell foam buffer 14 and the foam padding 18 within the interior volume 26 of the fabric cover 20 serves to position the closed-cell foam buffer 14 and the foam padding 18 in the proper position for installation upon the loading dock structural wall surface 16. The containment of the closed-cell foam buffer 14 and the foam padding 18 within the fabric cover 20 places the closed-cell foam buffer 14 and the foam padding 18 against one another.

Referring now to FIGS. 5-10, the plurality of fabric tabs 32 of the loading dock seal system 10 are adapted to be substantially flexible members that can be manipulated to conform to the various surface conditions of the loading dock structural wall surface 16. Accordingly, the fabric tabs 32 can be used to attach the fabric cover 20 with the foam composite bolster 74 inserted therein against a substantially flat surface of the loading dock structural wall surface 16. Alternatively, the flexible nature of the fabric tabs 32 allows for installation of the fabric tabs 32 at corner conditions 90 of the loading dock structural wall surface 16. In this manner, the fabric tabs 32 can bend around a corner condition 90 or extend rearward such that a side of the vertical or lintel sections 50, 54 can be substantially coplanar with the edge of the loading dock opening 52. It is also contemplated that the fabric tabs 32 can be installed at locations of the loading dock structural wall surface 16 having alternate geometries and surface conditions, such as where the outer surface of the loading dock structure 12 includes a substantially rough surface, angled or tiered siding, various other textured surfaces, as well as various surface shapes such as curved surfaces, angular surfaces, irregular surfaces, as well as others.

It is contemplated that, regardless of the shape and texture of the loading dock structural wall surface 16, the flexible nature of the fabric tabs 32 allows the fabric cover 20 with the foam composite bolster 74 disposed therein to be installed in a tight-fitting arrangement against the loading dock structural wall surface 16. This tight-fitting arrangement may be watertight when no transportation vehicle 58 is engaged against the loading dock seal system 10. It is also contemplated that the tight-fitting engagement created by the installation of the plurality of flexible fabric tabs 32 against the loading dock structural wall surface 16 provides for a watertight engagement between the fabric cover 20 and the loading dock structural wall surface 16 when a transportation vehicle 58 is engaged against the loading dock seal system 10. It is further contemplated that in the various embodiments, each of the plurality of fabric tabs 32 are substantially flexible and capable of being bent by hand without the use of tools during installation of the fabric tabs 32 against the loading dock structural wall surface 16. While a plurality of fabric tabs 32 are typically employed on each side of the loading dock seal system 10, it is also contemplated that a single elongated tab running along a substantial length of the sides between the top and bottom of the vertical sections 50 or the left and right of the lintel sections 54. Such a single tab may employ multiple, spaced apart grommets 100.

Referring again to FIGS. 1-10, in the various embodiments, it is contemplated that each of the plurality of fabric tabs 32 can include at least one grommet 100 that extends through each respective fabric tab 32 to define an aperture through the fabric tab 32. The grommet 100 can be used to add structural integrity to each of the plurality of fabric tabs 32 to substantially deter any tearing, stretching or other deformation that may occur within each of the plurality of fabric tabs 32, when installed upon the loading dock structural wall surface 16. The grommets 100 can be substantially rigid and resilient members that can be made of various materials including, but not limited to, metal, composite, plastic, combinations thereof, and other similar materials that can provide a structural opening through each of the plurality of fabric tabs 32 and through which a fastener 102 can be inserted to attach each of the plurality of fabric tabs 32 to the loading dock structural wall surface 16. The flexible nature of the fabric tabs 32 can allow each of the fabric tabs 32 to be bent or angled in a variety of directions to manipulate a grommet 100 of a particular fabric tab 32 to engage a corresponding fastener 102.

In the various embodiments, as illustrated in FIGS. 5-13, in order to attach the fabric tabs 32 and thereby the overall loading dock seal system 10 to the loading dock structural wall surface 16, a fastener 102 is disposed through the fabric tabs 32 at the grommet 100 in order to affix each of the plurality of fabric tabs 32 to the loading dock structural wall surface 16. The fasteners 102 used to attach the fabric tabs 32 can include, but are not limited to, nails, screws, ties, anchors, and other similar fasteners 102. It is contemplated that the type of fastener 102 used to attach the fabric tabs 32 can depend upon the material of the loading dock structure 12. By way of explanation, and not limitation, the type of fastener 102 used where the loading dock structure 12 is masonry, may be different than a fastener 102 used where the loading dock structure 12 is wood, metal, or some other material. It is contemplated that the fasteners 102 can be used through each of the fabric tabs 32 in order to provide a substantially permanent attachment between the fabric tabs 32 and the loading dock structural wall surface 16.

In various alternate embodiments, it is contemplated that the fabric tabs 32 can be selectively attached and unattached to wall fasteners 102 that are permanently affixed to the loading dock structural wall surface 16. In such an embodiment, the fasteners 102 can include a hooking structure 110 that is adapted to selectively engage a respective grommet 100 of one of the plurality of fabric tabs 32. In this manner, a fabric tab 32 can be stretched over the hooking structure 110 of the fastener 102 and affixed thereto for installation of the loading dock seal system 10. Where replacement or repair of a component of the loading dock seal system 10 is necessary, such as replacement of the closed-cell foam buffer 14 and foam padding 18, or the fabric cover 20, each of the fabric tabs 32 can be subsequently stretched and removed from the hooking structure 110 of the respective fastener 102 in order to conveniently remove one or more of the vertical or lintel sections 50, 54 of the loading dock seal system 10 for repair or replacement. As discussed above, the flexible nature of the fabric tabs 32 can allow for this convenient removal and replacement of the vertical and lintel sections 50, 54 of the loading dock seal system 10 by hand and without the use of tools. It is further contemplated that in this embodiment, the grommet 100 disposed within each of the fabric tabs 32, instead of or in addition to a grommet 100, can be larger than the hooking structure 110 of the fastener 102 attached to the loading dock structural wall surface 16. The grommet 100 can include a receiving structure defined within a portion of the grommet 100 that is configured to engage the hooking structure 110 of the fastener 102. It is also contemplated that in the various embodiments, the fabric tabs 32 can include a hook, tab or other similar interference structure that is configured to engage the hooking structure 110 at the fastener 102.

Referring again to FIGS. 5-10, it is contemplated that each of the plurality of fabric tabs 32 is sewn into direct physical engagement with the fabric cover 20. In this manner, each of the fabric tabs 32 can be sewn to the fabric cover 20 as part of a seam 120 created within the fabric cover 20. Alternatively, each of the plurality of fabric tabs 32 can be sewn upon a surface of the fabric cover 20 such that the fabric tab 32 is disposed outside the fabric cover 20. In the various embodiments, the fabric tab 32 can include a single fabric layer that is attached to the fabric cover 20. In various alternate embodiments, each fabric tab 32 can include two or more fabric layers that are sewn or otherwise attached together to form a multi-layer fabric tab 32. A multi-layer fabric tab 32 can also be created by folding a single fabric member over and onto itself to form two or more layers of fabric. The multi-layer fabric tab 32 can also be used to define a pocket 130 therein and into which stiffeners and/or reinforcing members can be disposed, as will be more fully described below.

In the various embodiments, each of the fabric tabs 32 can be made of various materials that can include, but are not limited to, vinyl, leather, flexible plastic, rubber, flexible polymers, combinations thereof, and other similar materials that are substantially flexible in nature and that can be moved by hand and without the use of tools. As discussed above, in various alternate embodiments, the fabric tabs 32 can be integral with the fabric cover 20.

Referring now to FIGS. 11-14, in various embodiments, a portion of each of the plurality of fabric tabs 32 can include the pocket 130 defined by front and back fabric walls surrounding and enclosing a support substrate member 132 disposed within the pocket 130. In such an embodiment, each support substrate member 132 can at least partially or wholly maintain a portion of the plurality of fabric tabs 32 in an orientation substantially parallel to and extending away from the fabric cover 20. In various embodiments, the support substrate member 132 can incorporate a grommet-type structure through which the fastener 102 can be installed. As such, the use of the support substrate member 132 can, in various embodiments, make the use of a grommet 100 unnecessary. In various alternate embodiments, the support substrate member 132 disposed within the pocket 130 of each of the fabric tabs 32 can be disposed proximate the grommet 100 to add further structural integrity to the portion of the fabric tab 32 proximate each grommet 100. In various embodiments, it is also contemplated that the support substrate member 132 can be attached directly to the grommet 100, or can be a portion of the grommet 100 itself that is disposed within the pocket 130 of the fabric tab 32 to provide additional surface area upon which the fabric tab 32 and the grommet 100 can be connected together.

Figure 13:
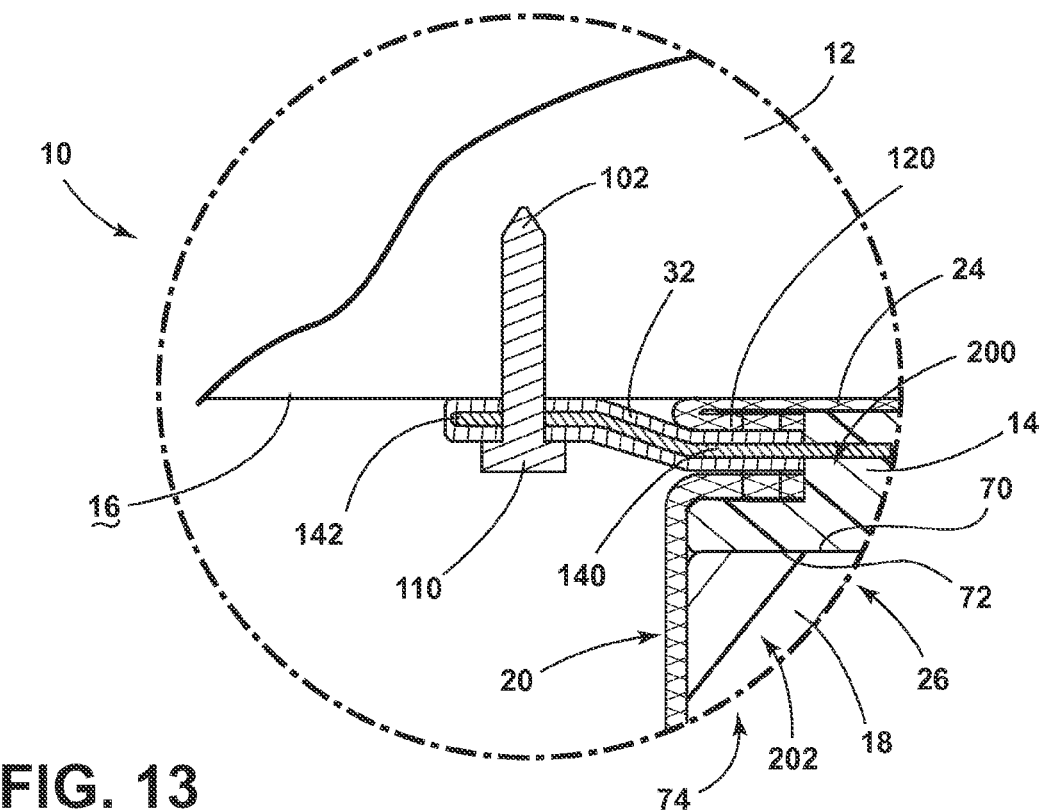
FIG. 13 is a cross-sectional view of a fabric tab of another alternate embodiment of the multi-layer foam dock seal system, with an elongated support substrate member disposed within the fabric tab and the fabric tab installed in a flush-mount condition.
Figure 14:
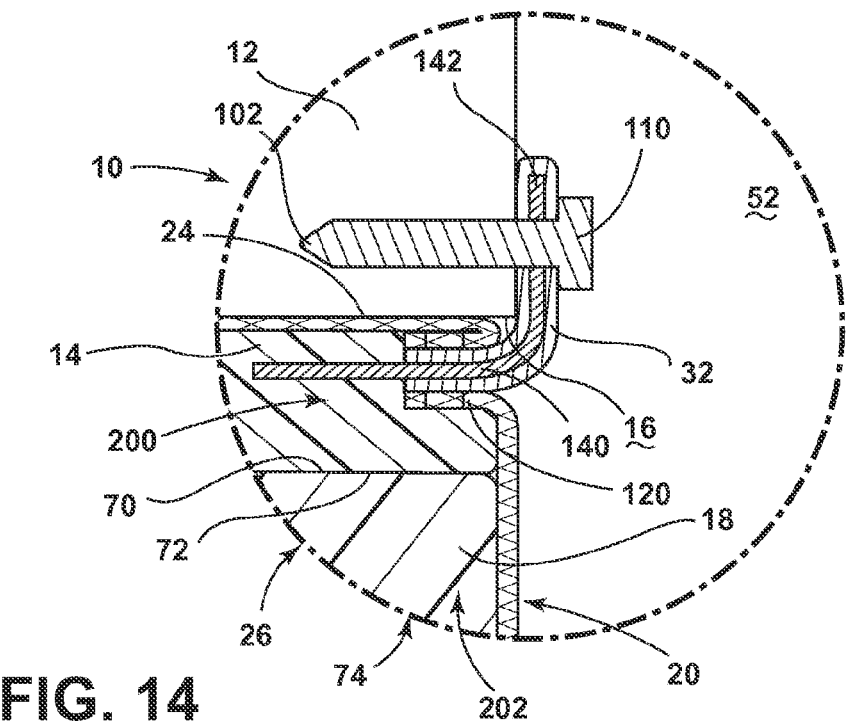
FIG. 14 is a detail cross-sectional view of a fabric tab of the multi-layer foam dock seal system of FIG. 13, with the fabric tab installed at a corner wall condition.

Referring now to the embodiment illustrated in FIGS. 13 and 14, the support substrate member 132 can extend at least the length of the fabric tab 32 such that the support substrate member 132 can be at least partially attached to the fabric cover 20 along with the fabric tab 32. It is further contemplated that the support substrate member 132 can at least partially extend into the interior volume 26 of the fabric cover 20 to provide greater attachment area between the fabric tab 32 and the fabric cover 20. In such an embodiment, it is contemplated that the support substrate member 132 is substantially flexible along with each of the fabric tabs 32 such that each of the fabric tabs 32 along with the corresponding support substrate member 132 can be bent and flexed by hand without the use of tools in order to install each of the fabric tabs 32 upon the loading dock structural wall surface 16. As discussed above, the loading dock structural wall surface 16 can have various textures and shapes and other non-planar surface conditions. In embodiments incorporating the elongated support substrate member 132, it is contemplated that the grommet 100 is adapted to extend at least partially through a portion of the support substrate member 132 that is disposed within the pocket 130 of the fabric tab 32. It is contemplated that the elongated support substrate member 132 can incorporate an integrated grommet-like structure.

In the various embodiments, it is contemplated that the support substrate member 132 can be made of various sturdy and flexible materials that can include, but are not limited to, metal, plastic, rubber, composite, combinations thereof, as well as other similar materials. It is further contemplated that the support substrate member 132 can include a substantially flexible portion 140 disposed within the fabric tab 32 between the grommet 100 or an integrated grommet-like structure and the fabric cover 20 to afford the fabric tab 32 with the flexibility for installation upon various surface conditions. The support substrate member 132 can also include a substantially rigid portion 142 disposed proximate the grommet 100, wherein the rigid portion 142 provides added structural integrity to the fabric tab 32 proximate the grommet 100. The substantially rigid portion 142 can also incorporate a grommet-like structure where a grommet 100 is not used.

Figure 15:
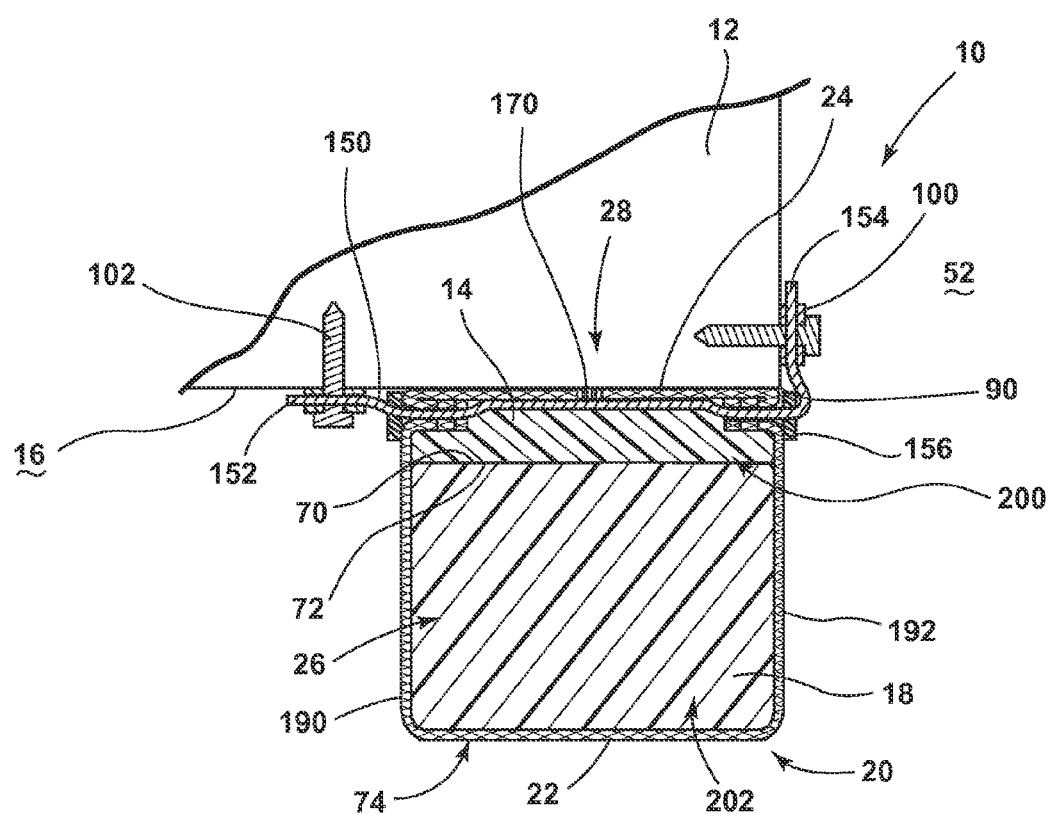
FIG. 15 is a cross-sectional view of another alternate embodiment of the multi-layer foam dock seal system with the fabric tabs extending completely through the multi-layer foam composite bolster.
Figure 16:
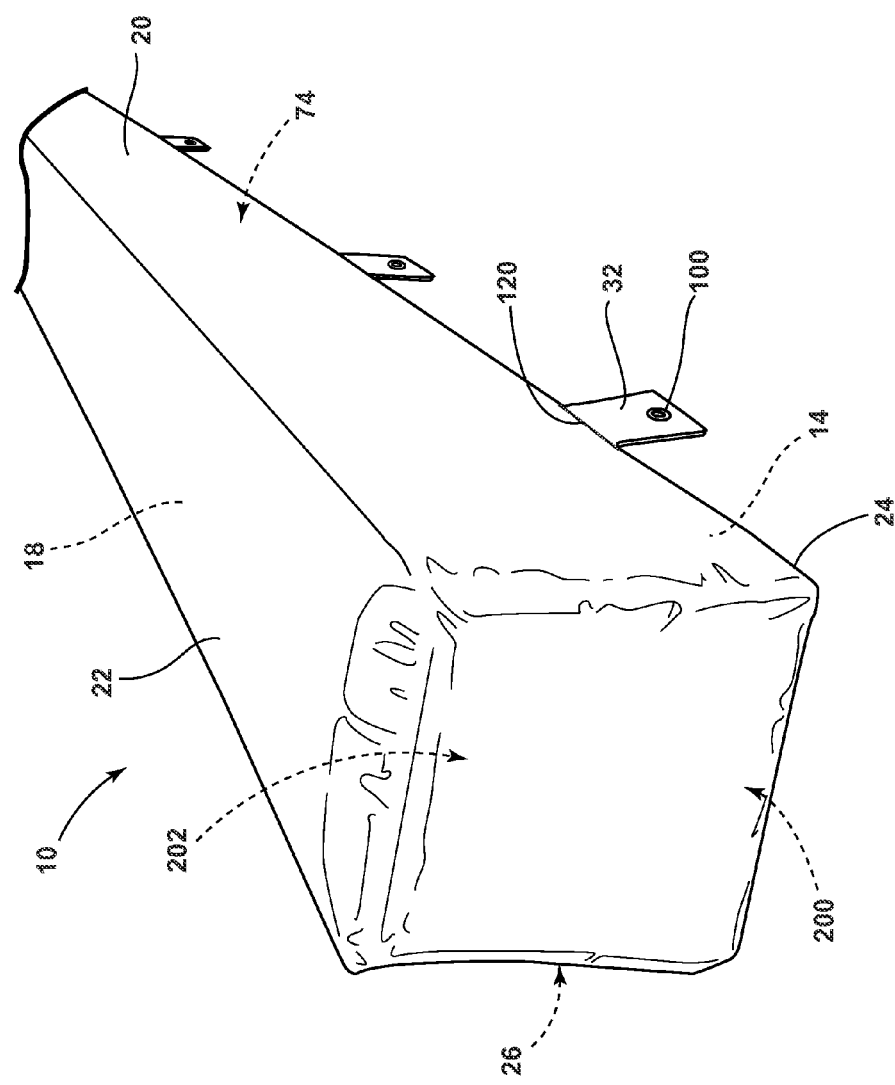
FIG. 16 is a top perspective view of another alternate embodiment of the multi-layer foam dock seal system with the multi-layer foam core disposed within the fabric cover and the fabric fasteners freely hanging downward.
Figure 17:
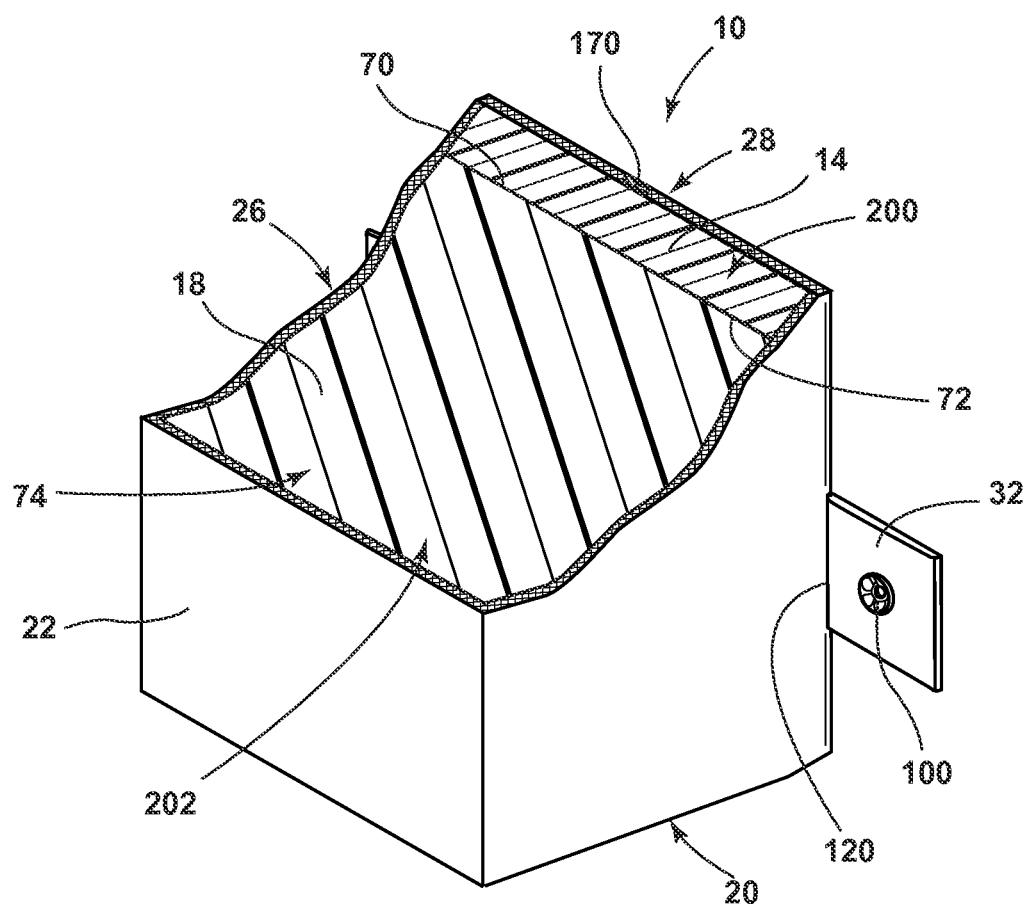
FIG. 17 is a detail cut-away section of an alternate embodiment of the multi-layer loading dock seal system.
Figure 18:
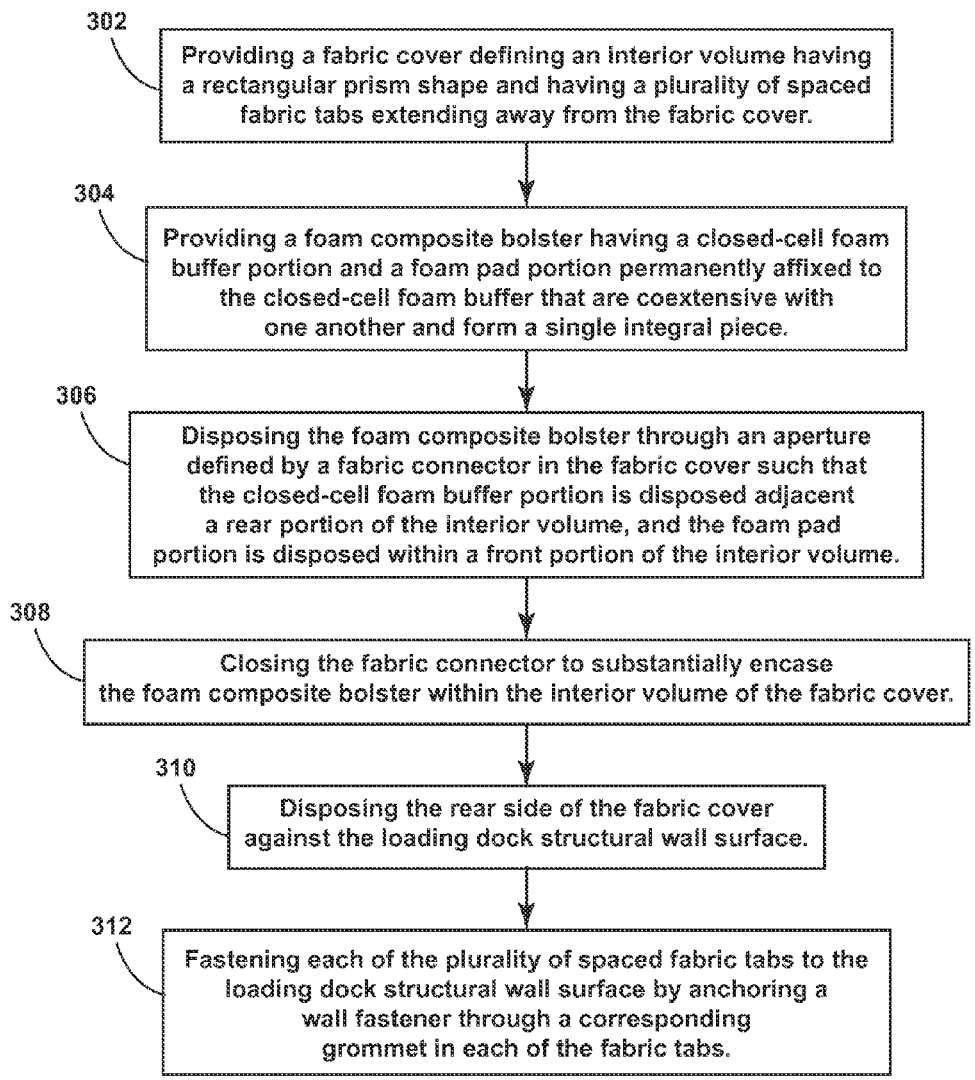
FIG. 18 is a schematic flow diagram illustrating a method for installing a multi-layer foam dock seal system upon a loading dock structure.
Figure 19:
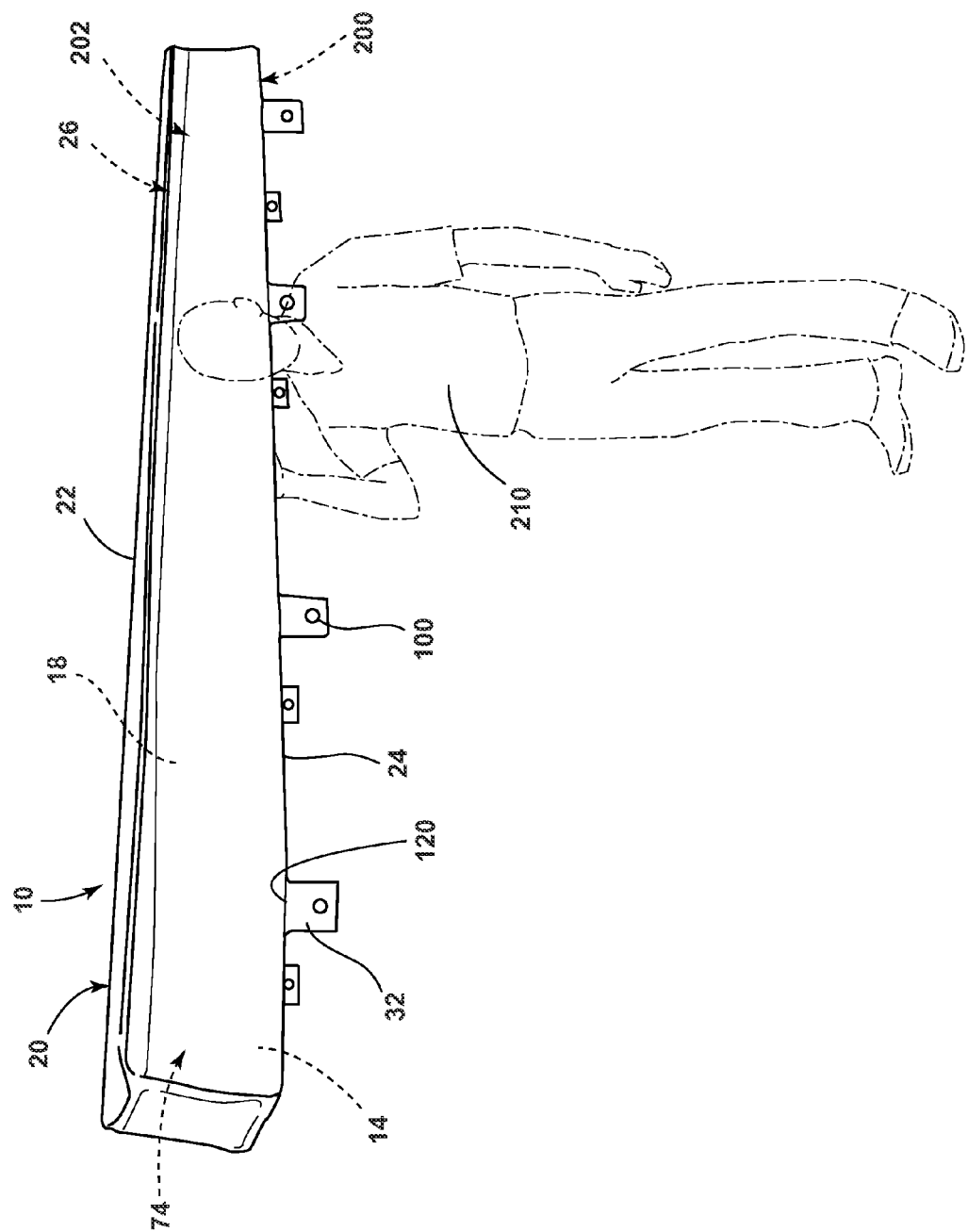
FIG. 19 is a side perspective view of the multi-layer foam dock seal system of FIG. 16 being carried by a single individual for installation upon a loading dock structure.
Figure 20:
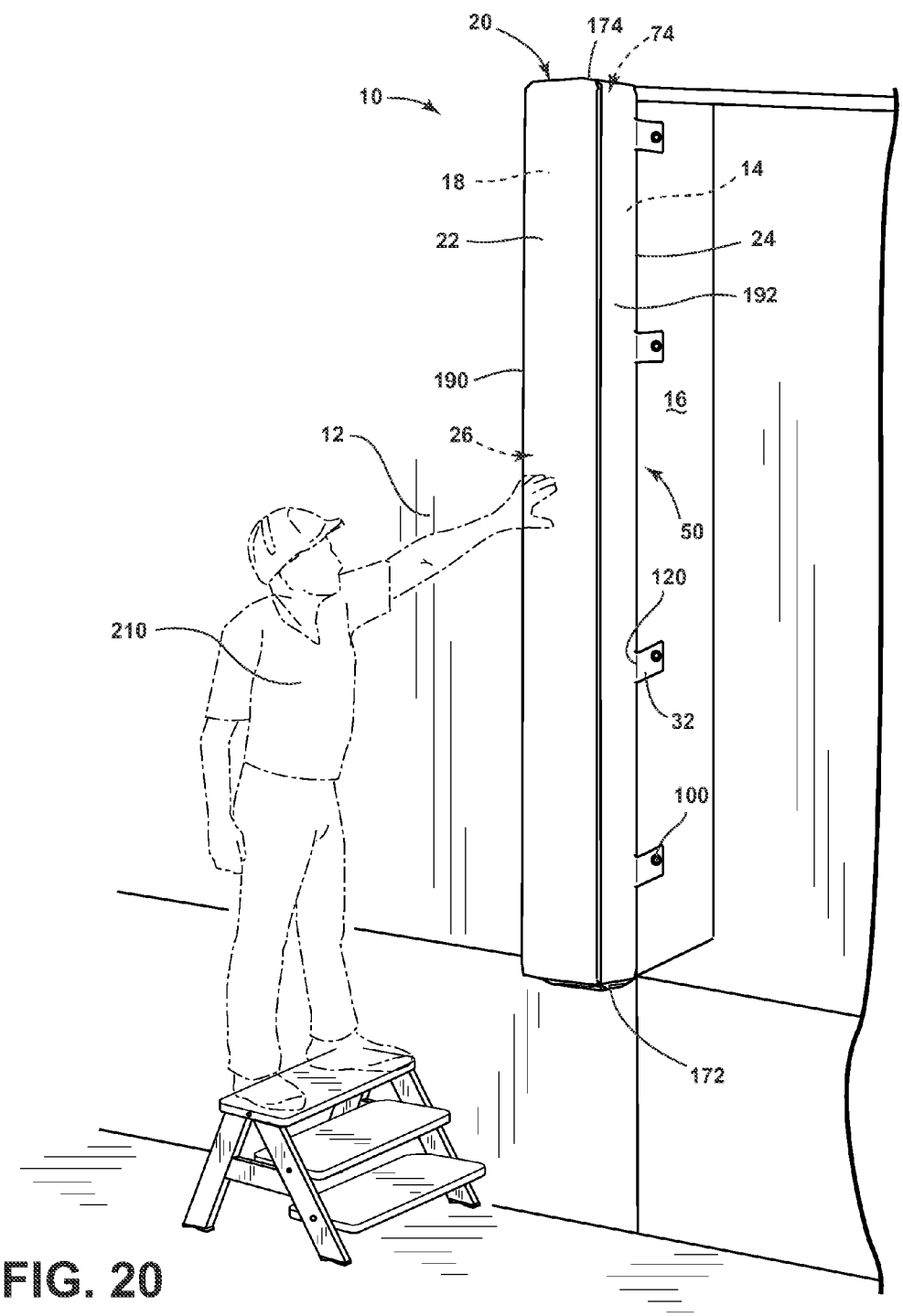
FIG. 20 is a side elevational view of the multi-layer loading dock system of FIG. 18 being held in place upon a loading dock structure by a single individual for installation upon the loading dock structure.

Referring now to the embodiment illustrated in FIG. 15, it is contemplated that the fabric tabs 32 can be disposed such that pairs of fabric tabs 32 extend through opposite sides of the fabric cover 20 at similar elevations. In such an embodiment, it is contemplated that a single elongated fabric tab 150 can extend through the fabric cover 20 where the elongated fabric tab 150 includes a grommet 100 on first and second ends 152, 154 of the elongated fabric tab 150. Accordingly, a grommet 100 can be disposed within each of the first and second ends 152, 154 of the elongated fabric tab 150 proximate the left and right sides 190, 192 of the fabric cover 20 for installation upon the loading dock structural wall surface 16. It is further contemplated that in various embodiments, an elongated support substrate member 132 can extend the full length of the elongated fabric tab 150 that extends through both sides of the fabric cover 20. In such an embodiment, it is also contemplated that the fabric cover 20 can include a secondary grommet 156 through which each of the first and second ends 152, 154 of the elongated fabric tab 150 can extend out from the fabric cover 20. In this manner, the secondary grommet 156 can serve to at least partially support the fabric tab 32 within a portion of the fabric cover 20 without stretching or otherwise deforming the fabric cover 20. In this embodiment, the elongated fabric tab 150 that extends through both sides of the fabric cover 20 can also extend through a portion of the foam composite bolster 74, or behind the foam composite bolster 74 between the fabric cover 20 and the back side of the foam composite bolster 74.

Referring again to FIG. 3, it is contemplated that the fabric fastener 28 of the fabric cover 20 can be a zipper 170 that extends along the rear side 24 of the fabric cover 20. It is further contemplated that the zipper 170 can be adapted to not extend the full height of the fabric cover 20, such that the zipper 170 extends along the rear side 24 of the fabric cover 20 from a location proximate a bottom end 172 of the rear side 24 of the fabric cover 20 to a location proximate a top end 174 of the rear side 24 of the fabric cover 20. In various alternate embodiments, the zipper 170 can extend the full height of the fabric cover 20 between the top and bottom ends 174, 172 of the fabric cover 20. Various other fabric fasteners can be used, wherein the fabric fastener 28 is a non-overlapping type fabric fastener. Such fabric fasteners 28 can include, but are not limited to, zippers, ties, and other similar non-overlapping fabric fasteners 28. While not typically employed, an overlapping fastener system such as a hook and loop Velcro® system may be used. The fabric fastener(s) 28 are typically configured to repeatedly open and close to allow user selective access to the interior volume 26 of the fabric cover 20. In various alternate embodiments, it is contemplated that the fabric fastener 28 can be disposed within the front, left or right sides 22, 190, 192 or within the top or bottom ends 174, 172 of the fabric cover 20. In such an embodiment, it is contemplated that removal and replacement of the foam composite bolster 74 can be accomplished without entirely disengaging the fabric cover 20 from the loading dock structural wall surface 16.

Referring now to FIGS. 16-20, having described the structure of the loading dock seal system 10, a method 300 is also disclosed for installing the loading dock seal system 10 onto a loading dock structural wall surface 16. The method 300 includes step 302 of providing a fabric cover 20 having front, rear, left and right sides 22, 24, 190, 192. The fabric cover 20 may be free of outwardly protruding overlapping portions and which defines an interior volume 26 having a rectangular prism shape. It is contemplated that other shapes of loading dock seal system 10 can be used for the vertical and lintel sections 50, 54. Such shapes can include, but are not limited by, trapezoidal prisms, arcuate prisms, irregular prisms, semi-circular prisms, cylindrical prisms, triangular prisms, non-prism shapes and others. It is also contemplated that the fabric cover 20 can include the fabric fastener 28 or connector that defines an aperture 30 within the fabric cover 20. The fabric fastener 28 can be configured to open and close the aperture 30 without using overlapping portions of the fabric cover 20. The fabric fastener 28 extends from a location proximate a bottom end 172 of the rear side 24 of the fabric cover 20 to a location proximate a top end 174 of the rear side 24 of the fabric cover 20. As discussed above, the fabric cover 20 can include the plurality of spaced fabric tabs 32 that extend away from the fabric cover 20. Each of the plurality of spaced fabric tabs 32 includes at least one grommet 100. Each of the fabric tabs 32 is adapted to be flexible and capable of being bent by hand without the use of tools. It is contemplated that the fabric cover 20, fabric tabs 32 and fabric fastener 28 can also be constructed as described previously.

According to the method 300, once the fabric cover 20 is provided, a foam composite bolster 74 is also provided (step 304). The foam composite bolster 74 is inserted into and later can be removed from the interior volume 26 of the fabric cover 20 via the aperture 30. One portion of the foam composite bolster 74 can include the closed-cell foam buffer 14 that includes a material having a density within the range of at least about 2.1 lb/ft$^3$ to about 4.3 lb/ft$^3$. Another portion of the foam composite bolster 74 can include the foam padding 18 that is typically permanently affixed to the closed-cell foam buffer 14 or the composite of the buffer 14 and the padding 18 may be produced or constructed as discussed previously. As described above, the foam composite bolster 74 can be made of two separate foam members such that each foam member, the closed-cell foam buffer 14 and the foam padding 18, can be individually inserted or removed through the aperture 30 or simultaneously inserted. The foam composite bolster 74 can also be made of the permanently affixed or integrally formed closed-cell foam buffer 14 and foam padding 18 that can be inserted or removed through the aperture as a single piece. The foam padding 18 of the foam composite bolster 74 can include a material having an average density within the range of approximately 0.8 lb/ft$^3$ to 1.1 lb/ft$^3$. It is contemplated that the closed-cell foam buffer 14 and the foam padding 18 of the foam composite bolster 74 are typically coextensive with one another and form a single integral piece.

Referring again to FIGS. 16-20, after providing the foam composite bolster 74, the foam composite bolster 74 is disposed through the aperture 30 defined by the fabric fastener 28 such that the closed-cell foam buffer 14 is disposed adjacent to a rear portion 200 of the interior volume 26 and proximate the inside surface of the rear side 24 of the fabric cover 20 (step 306). The foam padding 18 is then disposed within a front portion 202 of the interior volume 26 and proximate an inside surface of the front side 22 of the fabric cover 20. The manner in which the foam composite bolster 74 is inserted into the interior volume 26 of the fabric cover 20 can depend upon the location of the fabric fastener 28. Where the fabric fastener 28 is within the rear side 24 of the fabric cover 20, the fabric cover 20 should be at least partially disengaged from the loading dock structural wall surface 16 to access the fabric fastener 28. The foam composite bolster 74 can then be inserted by placing one end of the foam composite bolster 74 through the aperture 30 and extending the fabric cover 20 around the remainder of the foam composite bolster 74. Where the fabric fastener 28 is located on a side of the fabric cover 20 other than the rear side 24, the foam composite bolster 74 can be inserted and removed through the aperture 30 without removing the fabric cover 20 from the loading dock structural wall surface 16. It is also contemplated that the fabric fastener 28 can be located along one or more edges of the fabric cover 28 such that, when opened, the fabric fastener 28 allows an entire side of the fabric cover 20 to open in order to access the interior volume 26 of the fabric cover 20. Once the foam composite bolster 74 is disposed within the interior volume 26 of the fabric cover 20, the fabric fastener 28 can be closed to substantially encase the foam composite bolster 74 within the interior volume 26 of the fabric cover 20 (step 308). As discussed above, the fabric fastener 28 of the fabric cover 20 is typically any non-overlapping fabric fastener 28 such as zippers, ties, as well as other similar non-overlapping fabric connectors.

Referring again to FIGS. 16-20, once the components of the loading dock seal system 10 are manufactured and assembled, these components can be disposed upon the predetermined portions of the loading dock structural wall surface 16 adjacent the loading dock opening 52 (step 310). For installation upon the loading dock structural wall surface 16, the rear side 24 of the fabric cover 20 is typically disposed against the loading dock structural wall surface 16. In this manner, each of the plurality of spaced fabric tabs 32 can extend or can be moved to extend away from the rear side 24 of the fabric cover 20. The exact configuration of the fabric tabs 32 can depend upon the exact location of the vertical and/or lintel sections 50, 54 in relation to the loading dock opening 52. Where a side of one or more of the vertical and lintel sections 50, 54 is near or at an edge of the loading dock opening 52, a portion of the fabric tabs 32 may bend into the loading dock opening 52 or may extend straight back into the loading dock opening 52. Accordingly, a back surface 72 of each of the plurality of fabric tabs 32 is positioned in at least partial engagement with the loading dock structural wall surface 16 or with an edge of the loading dock opening 52. Once so positioned, each of the plurality of spaced fabric tabs 32 is fastened to the loading dock structural wall surface 16, by anchoring a wall fastener 102 through each corresponding grommet 100 (step 312). It is contemplated that each wall fastener 102 fixes a corresponding spaced fabric tab 32 of the plurality of spaced fabric tabs 32 against the loading dock structural wall surface 16. By fixing the plurality of spaced fabric tabs 32 to the loading dock structural wall surface 16, this attachment substantially presses the closed-cell foam buffer 14 toward the loading dock structural wall surface 16 to form a substantially water-tight seal between the rear side 24 fabric cover 20 and the loading dock structural wall surface 16. This attachment step 312 is repeated for each section of the loading dock seal system 10 including the vertical sections 50 and the lintel section 54 of the loading dock seal system 10, as well as any other sections that may be included in the loading dock seal system 10.

Referring now to FIGS. 16-20, in the various embodiments, each section of the loading dock seal system 10 is adapted to be substantially lightweight, such that a single individual 210 can carry and and install the various vertical and lintel sections 50, 54 of the loading dock seal system 10 without assistance from another individual. In this manner, the foam composite bolster 74 can be disposed through the aperture 30 and into the interior volume 26 of the fabric cover 20 by a single individual 210 by hand and without the use of tools until the entire bolster is positioned within the interior volume of the fabric cover. Because the foam composite bolster 74 is made entirely of foam, it is substantially lightweight such that it can be carried and manipulated by a single individual 210. Additionally, because the foam is at least partially flexible, manipulating the foam composite bolster 74 through the aperture 30 and into the interior volume 26 of the fabric cover 20 can be conveniently accomplished by a single individual 210. Additionally, after the foam composite bolster 74 is installed within the interior volume 26 of the fabric cover 20, the fabric cover 20 with the foam composite bolster 74 disposed therein can be mounted onto the loading dock structural wall surface 16 by a single individual 210. As discussed above, each section of the loading dock seal system 10 includes the foam composite bolster 74 and the fabric cover 20. This efficient use of material serves to create a loading dock seal system 10 that, as discussed above, is substantially lightweight (typically about 12 lbs. or less, more typically from about 30 lbs. to about 60 lbs.) such that a single individual 210 can carry, position, and install each of the vertical and lintel sections 50, 54 of the loading dock seal system 10 without assistance from another individual. Additionally, the size of each of the vertical and lintel sections 50, 54 is sized to be able to be handled, lifted, carried and otherwise manipulated by a single individual. Each section can include a height of about 96 inches, a width of about 10 inches to about 18 inches and a depth of about 6 inches to about 12 inches. In the various embodiments, the height and other dimensions of the vertical and lintel sections 50, 54 can be dictated by the size of the loading dock opening 52. It is to be understood that while a single individual 210 can install the various components of the loading dock seal system 10, multiple individuals can also assemble and install the various sections of the loading dock seal system 10. Due to the lightweight nature of the vertical and lintel sections 50, 54 and other aspects of the loading dock seal system(s) 10, the loading dock seal system 10 can be installed faster and more precisely than previous systems employing heavy materials and using one or more separate mounting brackets, for example.

In the various embodiments of the method 300 described above, it is contemplated that while the various wall fasteners 102 are anchored to the loading dock structural wall surface 16, the plurality of spaced fabric tabs 32 can be removed and subsequently placed onto the wall fasteners 102 without first removing the wall fasteners 102 from the loading dock structural wall surface 16. In this manner, the fabric cover 20 with the foam composite bolster 74 disposed within the interior volume 26 of the fabric cover 20 can be subsequently removed from and replaced onto the loading dock structural wall surface 16 by hand without the use of tools.

In such an embodiment, the wall fasteners 102 can be anchored to the loading dock structural wall surface 16 during the initial installation of the vertical and lintel sections 50, 54 of the loading dock seal system 10. After this initial installation, the vertical and lintel sections 50, 54 of the loading dock seal system 10 can be attached to and subsequently removed from the pre-installed fasteners 102. In this manner, and as discussed above, the vertical and lintel sections 50, 54 of the loading dock seal system 10 can be removed for repair or replacement, and subsequently reattached to the loading dock structural wall surface 16 using the pre-installed wall anchors. In this manner, a second foam composite bolster having the same, similar or different physical properties can be inserted within the interior volume 26 to replace the other foam composite bolster 74. Also, the removability of the vertical and lintel sections 50, 54 can also allow for replacement of any of the components of the fabric cover 20, including, but not limited to, the fabric tabs 32, any of the grommets 100, the fabric fastener 28 or the entire fabric cover 20. Additionally, during installation of the various components of the loading dock seal system 10, each of the plurality of fabric tabs 32 are adapted to bend around a corner portion or other portion of the loading dock structure 12 adjacent to the loading dock structural wall surface 16. In this manner, at least a portion of the plurality of fabric tabs 32 can be anchored to a portion of the loading dock structure 12 adjacent to the loading dock structural wall surface 16 that is substantially perpendicular to the rear side 24 of the fabric cover 20. In this manner, the vertical sections 50 may substantially align along one side (or the top edge in the case of the lintel section) with the perimeter of the loading dock opening. Additionally, the fabric tabs 32 can be bent around various non-planar features and textures of the loading dock structural wall surface 16, such that a substantially tight fit between the fabric cover 20 and the loading dock structural wall surface 16 can be maintained.

It is contemplated that each of the individual features of the various embodiments disclosed above can used in combination with any other individual feature or combination of features of the various embodiments disclosed herein.

The invention claimed is:

1. A loading dock seal system comprising:
  a closed-cell foam buffer;
  a foam padding disposed adjacent the closed-cell foam buffer and affixed thereto thereby forming a bolster;
  a fabric cover having a front portion, a rear portion, a first side portion, a second side portion and an interior volume accessible via an access aperture, wherein the bolster is disposed within the interior volume such that the closed-cell foam buffer engages the rear portion of the fabric cover and the foam padding engages the front portion of the fabric cover, and wherein the fabric cover is free of overlapping members at least proximate the loading dock structural wall surface;
  at least one fabric fastener configured to close and open the aperture through the fabric cover, and wherein the aperture is sized to receive and to release the bolster from the interior volume; and
  a plurality of loading dock structure-engaging fabric tabs sewn into direct physical engagement with the fabric cover proximate the rear portion and the first side portion as well as the rear portion and the second side portion and proximate the junction of the at least one of (1) the rear portion and the first side portion and (2) the rear portion and the second side portion, wherein the plurality of fabric tabs extend away from the rear portion when engaged with the loading dock structural wall surface, wherein the system is free of wall mounting brackets to engage the cover with the loading dock structural wall surface, wherein a portion of the plurality of fabric tabs includes a pocket with front and back fabric walls surrounding and enclosing a rigid metallic support substrate member within the pocket, and wherein each rigid metallic support substrate member at least partially maintains the portion of the plurality of fabric tabs in an orientation substantially parallel to and extending away from the fabric cover, and wherein the fabric tabs extend from a portion of the closed-cell foam buffer.

2. The loading dock seal system of claim 1, wherein the access aperture is a slit and wherein the fastener is a zipper that closes and opens the slit wherein the slit extends from a location proximate a bottom end of the rear portion of the fabric cover to a location proximate a top end of the rear portion of the fabric cover.

3. The loading dock seal system of claim 1, wherein a front surface of the closed-cell foam buffer is engaged with a rear surface of the foam padding to form an integral foam composite bolster, wherein the closed-cell foam buffer and the foam padding are coextensive with one another, wherein the front surface of the closed-cell foam buffer engages the rear surface of the foam padding along a single plane.

4. The loading dock seal system of claim 3, wherein the closed-cell foam buffer has a density of from about 2.1 pounds per cubic foot to about 4.3 pounds per cubic foot, and wherein the foam padding has an average density of approximately 0.92 pounds per cubic foot.

5. The loading dock seal system of claim 4, wherein the material of the closed-cell foam buffer has a compressive strength of approximately 7 pounds per square inch to approximately 20 pounds per square inch.

6. The loading dock seal system of claim 4, wherein the material of the closed-cell foam buffer has a compressive strength of approximately 13 pounds per square inch to approximately 24 pounds per square inch.

7. The loading dock seal system of claim 1, wherein the closed-cell foam buffer is a substantially rigid foam adapted to substantially conform to the loading dock structural wall surface to form a substantially water-tight seal between the fabric cover and the loading dock structural wall surface.

\* \* \* \* \*